United States Patent [19]
Nitta

[11] Patent Number: 5,699,635
[45] Date of Patent: Dec. 23, 1997

[54] METHOD AND APPARATUS FOR FEEDING A LIQUID MATERIAL TO A TREE

[75] Inventor: Masao Nitta, 1-20, Kadotayashiki 3-chome, Okayamashi-shi, Okayama, Japan

[73] Assignees: Ikari Corporation, Tokyo; Masao Nitta, Okayamashi, both of Japan

[21] Appl. No.: 664,022

[22] Filed: May 28, 1996

[30] Foreign Application Priority Data

May 26, 1995 [JP] Japan ................................. 7-152544

[51] Int. Cl.⁶ ............................................. A01G 29/00
[52] U.S. Cl. ................................... 47/57.5; 47/1.5
[58] Field of Search ......................... 47/57.5, 1.01, 47/1.5

[56] References Cited

U.S. PATENT DOCUMENTS

| | | | |
|---|---|---|---|
| 1,805,550 | 5/1931 | Lipman | 47/57.5 |
| 2,730,838 | 1/1956 | Wilson | 47/1.01 |
| 2,748,534 | 6/1956 | Richmond | 47/1.01 |
| 2,784,529 | 3/1957 | Prestigiacomo | 47/57.5 |
| 2,938,304 | 5/1960 | Thomas | 47/57.5 |
| 4,348,834 | 9/1982 | Martin | 47/57.5 |

FOREIGN PATENT DOCUMENTS

| | | | |
|---|---|---|---|
| 1015864 | 4/1949 | France | 47/57.5 |
| 62-17485 | 4/1987 | Japan . | |
| 3-42056 | 6/1991 | Japan . | |

*Primary Examiner*—Henry E. Raduazo
*Attorney, Agent, or Firm*—Merchant Gould Smith Edell Welter and Schmidt

[57] ABSTRACT

A method is provided for feeding a liquid material to a tree by using a liquid feeding apparatus which has a container body. A selected branch or root of the tree has bifurcated offshoots which are cut in a manner such that the bifurcated offshoots partially remain with the branch or root, and the liquid feeding apparatus is attached to the branch or root in a manner such that the remaining bifurcated offshoots are inserted into the container body. In this condition, the liquid material is supplied into the container body from a liquid storage tank while expelling air from the container body.

11 Claims, 4 Drawing Sheets

METHOD AND APPARATUS FOR FEEDING A LIQUID MATERIAL TO A TREE

BACKGROUND OF THE INVENTION

1. Field of the Invention

The present invention relates to a method for feeding to a tree a liquid material such as an agricultural chemical liquid (e.g. insecticide), a nutritious liquid or water for various purposes which include elimination or removal of harmful insects or fungi, promotion or control of the tree growth, or quality improvement of the tree.

2. Description of the Related Art

It is often necessary to feed agricultural chemicals to trees for protecting against harmful insects or fungi. Further, growth of trees may be assisted or promoted by feeding nutritious liquids.

One method for feeding an agricultural chemical or nutritious liquid to a tree is spraying over the entire tree. However, this method has been found insufficiently effective for protecting against insects or fungi living inside the tree. Further, the spraying method is adversely affected by rain while also being laborious. Moreover, the spraying method is known to be detrimental to the human being and the environment.

Another method is to spray an agricultural chemical or nutritious liquid over the soil or inject it into the soil, thereby causing liquid absorption through the roots of a tree. However, such a method is also disadvantageous in causing environmental pollution.

A further method is to make holes in the trunk of a tree for directly injecting an agricultural chemical or nutritious liquid in the tree. However, in the case where the tree is utilized for decorative or ornamental purposes, the holes in the tree trunk are detrimental to visual attractiveness. Further, the holes may cause decay, abnormal growth and/or strength decrease of the tree.

In view of the above-described problems of the conventional liquid feeding methods, the inventor of the present invention has previously proposed two improved methods for feeding a liquid material to a tree. A first method utilizes a liquid feeding apparatus which is attached to a root of a tree, as disclosed in Japanese Patent Publication No. 62-17485(Published: Apr. 17, 1987). A second method also utilizes a liquid feeding apparatus, but the liquid feeding apparatus is attached to a branch of a tree, as disclosed in Japanese Patent Publication No. 3-42056 (Published: Jun. 26, 1991).

For better understanding of the prior art, reference is now made to FIG. 5 of the accompanying drawings which illustrates a liquid feeding apparatus similar to the one disclosed in Japanese Patent Publication No. 3-42056.

As shown in FIG. 5, the liquid feeding apparatus designated by reference numeral 21 comprises a liquid container body 22 made of latex rubber. The container body 22 has an integral liquid supply connector 23 which is rearwardly directed for connection to a liquid supply tube 22. The container body 22 also has an upwardly bulging portion 25 which is integrally formed with an air vent connector 26 for connection to an air vent tube 27. The container body 22 is forwardly open and is removably connected to a fixing hood 29 by means of a mounting ring 28 screwed onto the container body 22.

In use, the fixing hood 29 is closely fitted onto a tree branch which is cut to have no bifurcated portion. A liquid material such as an agricultural chemical liquid is supplied into the container body 22 from an unillustrated liquid storage tank through the liquid supply tube 22. As the liquid material fills the container body 22, air is expelled out of the container body 22 through the air vent tube 27.

While the use of the liquid feeding apparatus 21 overcomes the problems of the conventional liquid feeding methods, it still has the following problems.

First, since the fixing hood 29 need be closely fitted onto the cut branch B, a plurality of variously sized fixing hoods need be interchangeably used for adaptation to different sized branches. Obviously, this results in a great cost increase.

Secondly, since the fixing hood 29 is sized and configured to be closely fitted onto the non-bifurcated portion of the branch B, bifurcated offshoots of a branch cannot be inserted into the container body 22. In this regard, the inventor has recently found, through professional experience as an orchard owner, that a branch of a tree (fruit tree in particular) exhibits a very high vitality (hence, a high liquid absorbing ability) at or near a portion of bifurcation. Nevertheless, the fixing hood 29 of the prior art liquid feeding apparatus 21 is not designed to allow insertion of a branch having bifurcated offshoots.

SUMMARY OF THE INVENTION

It is, therefore, an object of the present invention to provide a method for feeding a liquid material to a tree in such a manner as to accelerate liquid absorption by the tree.

Another object of the present invention is to provide an apparatus for feeding a liquid material to a tree which can be adapted to variously sized branches and/or roots of the tree without need for replacing a fixing element of the apparatus.

According to one aspect of the present invention, there is provided a method for feeding a liquid material to a tree by using a liquid feeding apparatus which has a container body, the tree having a branching portion with bifurcated offshoots, the method comprising the steps of:

cutting the bifurcated offshoots in a manner such that they partially remain with the branching portion;

attaching the liquid feeding apparatus to the branching portion in a manner such that the remaining bifurcated offshoots are inserted into the container body; and supplying the liquid material into the container body from a liquid storage tank while expelling air from the container body.

Throughout the specification, the term "branching portion" is used to designate a branch which extends out from the trunk of a tree, or a branching root portion which extends out from a main root. Further, the term "offshoot" is used to represent a part of the branching portion (branch or root) which extends out from the bifurcating point of the branching portion.

According to the method described above, since the branching portion has a very high vitality near the bifurcating point, the bifurcated overshoots of the branching portion will provide a high liquid absorbing ability when cut near the bifurcating point. Thus, the liquid material such as an insecticide liquid or a nutritious liquid can be effectively absorbed by the tree to promote healty growth of the tree.

According to another aspect of the present invention, there is provided an apparatus for feeding a liquid material to a tree, comprising:

a container body;

an elastically flexible fixing hood connected to the container body for receiving a branching portion of the tree;

liquid supply means for supplying the liquid material into the container body;

vent means for expelling air from the container body; and tightening means for elastically contracting the fixing hood to fix the container body to the branching portion.

With the liquid feeding apparatus described above, the combination of the elastically flexible fixing hood and the tightening means makes it possible to firmly fix the apparatus to any one of variously sized branches or roots. Thus, there is no need for replacing the fixing hood with a differently sized fixing hood when the liquid feeding apparatus is attached to a new branch or root.

Preferably, the container body may be made of a transparent material for enabling visual inspection of the liquid filling condition inside the container body. Further, the tightening means may comprise a tightening strap attached to the fixing hood, thereby realizing a cost reduction.

The container body may have an upwardly bulging portion to which the vent means is connected, and the bulging portion of the container body may be made continuous with a rounded corner portion. Such a configuration ensures smooth and complete expelling of air from the container body as the supplied liquid material fills the container body.

According to a preferred embodiment, the container body has a bottom wall which is downwardly inclined from the liquid supply means. Such an arrangement ensures that the liquid material supplied into the container body is entirely absorbed by the tree.

Other objects, features and advantages of the present invention will become apparent from the following description of the preferred embodiments given with reference to the accompanying drawings.

DETAILED DESCRIPTION OF THE PREFERRED EMBODIMENTS

Figure 1:
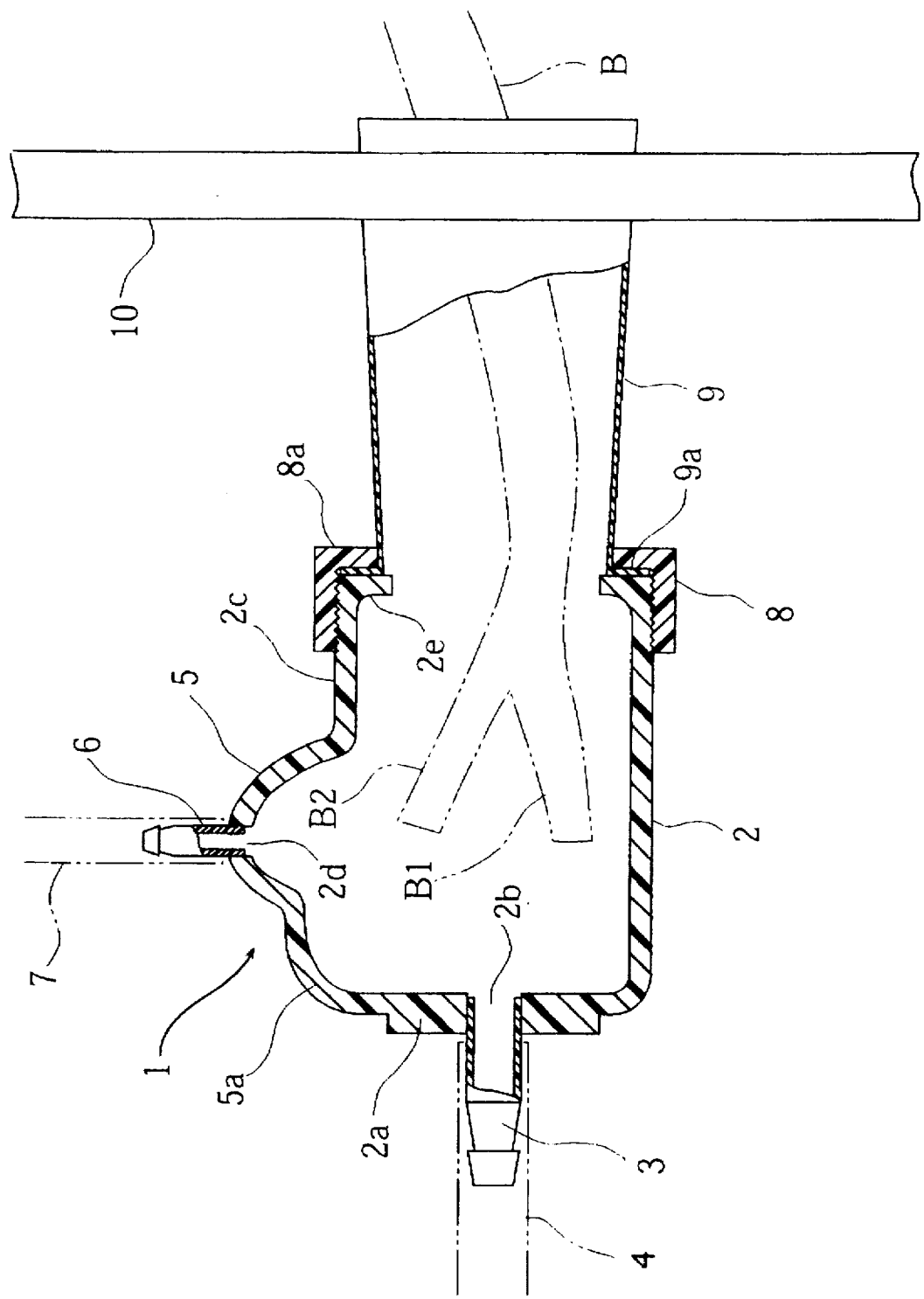
FIG. 1 is a side view, partially in section, showing a liquid feeding apparatus embodying the present invention.

Referring first to FIG. 1 of the accompanying drawings, there is illustrated a liquid feeding apparatus according to a first embodiment of the present invention. The liquid feeding apparatus which is generally designated by reference numeral 1, comprises a liquid container body 2 made of a transparent hard resin material. The container body 2 has a rear end wall 2a formed with a liquid supply port 2b which is fitted with a liquid supply connector 3 for connection to a liquid supply tube 4. The connector 3 may be separately made of a hard resin material. Alternatively, the connector 3 may be an integral part of the container body 2.

The container body 2 also has a generally cylindrical wall 2c. An intermediate portion of the cylindrical wall 2c is formed with an upwardly bulging portion 5 which is rendered smoothly continuous with the rear end wall 2a via a rounded corner portion 5a. The upwardly bulging portion 5 is formed, at its apex, with an air vent port 2d which is fitted with an air vent connector 6 for connection to an air vent tube 7. Further, the cylindrical wall 2c has a front end portion which is externally threaded.

The container body 2 further has a front end wall 2e which is centrally open. A mounting ring 8 is threaded onto the externally threaded front end portion of the cylindrical wall 2c.

The mounting ring 8 has an inward flange 8a in opposed relation to the front end wall 2e. Similarly to the container body 2, the mounting ring 8 may be made of a transparent hard resin material.

A fixing hood 9 is attached to the front end wall 2e of the container body 2. Specifically, the fixing hood 9 has a thickened end sealing flange 9a which is clamped between the front end wall 2e of the container body 2 and the inward flange 8a of the mounting ring 8. The fixing hood 9 is made of a soft plastic material so as to be elastically flexible for diametrical contraction and restoration. In the illustrated example, the fixing hood 9 flares away from the front end wall 2e of the container body 2 for facilitating insertion and withdrawal of a tree branch B even if the latter has bifurcated offshoots B1, B2.

In the illustrated example, while the sealing flange 9a of the fixing hood 9 is an integral part, it may be made separately from the fixing hood 9 and attached thereto by thermal fusion or adhesive bonding for example.

A front end portion of the fixing hood 9 is attached to a soft plastic tightening strap 10 by thermal fusion or adhesive bonding for example. The strap 10 is used to fix the fixing hood 9 to the inserted tree branch B, as described below. Optionally, the plastic strap 10 may be replaced by a non-plastic strap, a wire or the like.

The liquid feeding apparatus 1 described above may be used for feeding a liquid material to a tree. Typical examples of liquid material include an insecticide solution and a nutritious solution. The liquid feeding apparatus 1 may also be used simply for feeding water to a tree.

Figure 2:
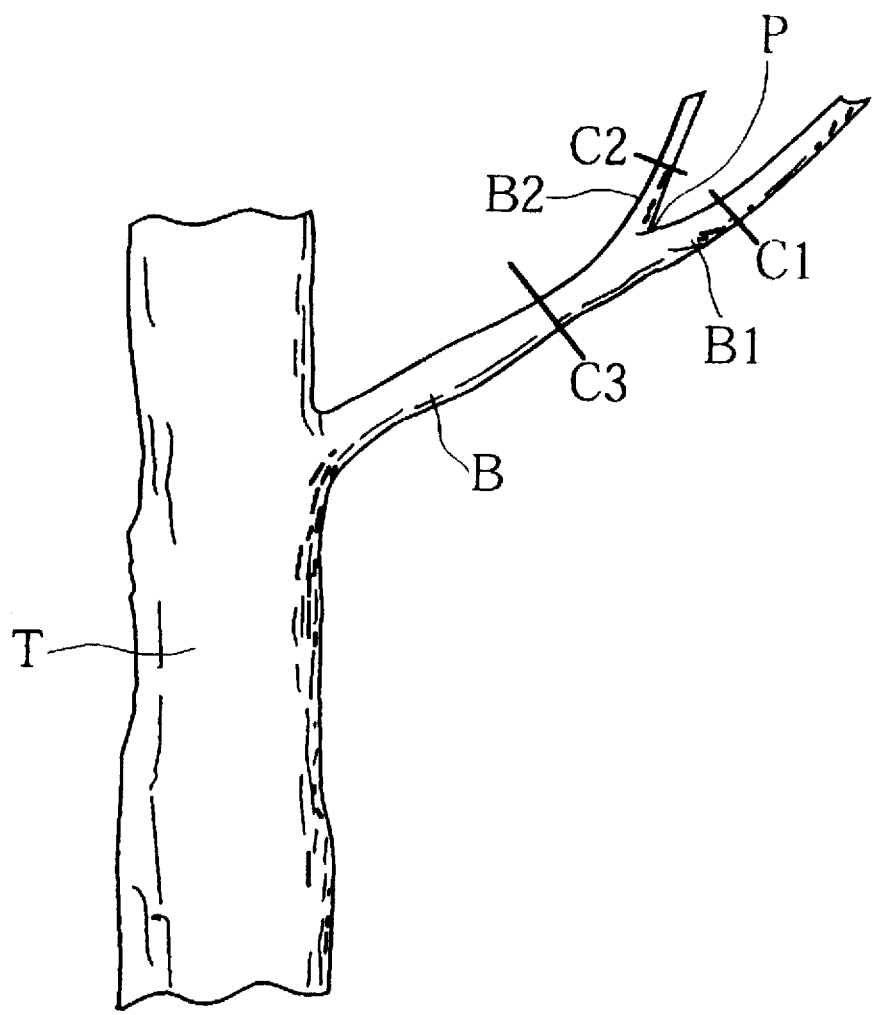
FIG. 2 is a fragmentary elevational view showing a tree for which the liquid feeding apparatus is used.

In use of the liquid feeding apparatus 1, a branch B of a target tree T having bifurcated offshoots B1, B2 is selected for attaching the liquid feeding apparatus 1, as shown in FIG. 2. Before attachment of the liquid feeding apparatus 1, the bifurcated offshoots B1, B2 of the selected branch B are cut at respective positions C1, C2 near the bifurcating point P. The distance of the respective cutting positions C1, C2 from the bifurcating point P may be about 20 cm. Since the selected branch B has a very high vitality at the point of bifurcation, so that the cut offshoots B1, B2 of the branch B provide a high liquid absorbing ability.

The number of branches (having bifurcated offshoots) to be selected for liquid feeding depends on the trunk diameter of the target tree T at the human eye level or height (eye-level trunk diameter). For instance, if the eye-level trunk diameter of the target tree T is less than 10 cm, only one branch may be selected for liquid feeding. If the eye-level trunk diameter of the target tree T is in the range of 10–30 cm, three branches may be preferably selected. If the eye-level trunk diameter of the target tree T is above 30 cm, at least four branches may be preferably selected.

Figure 3:
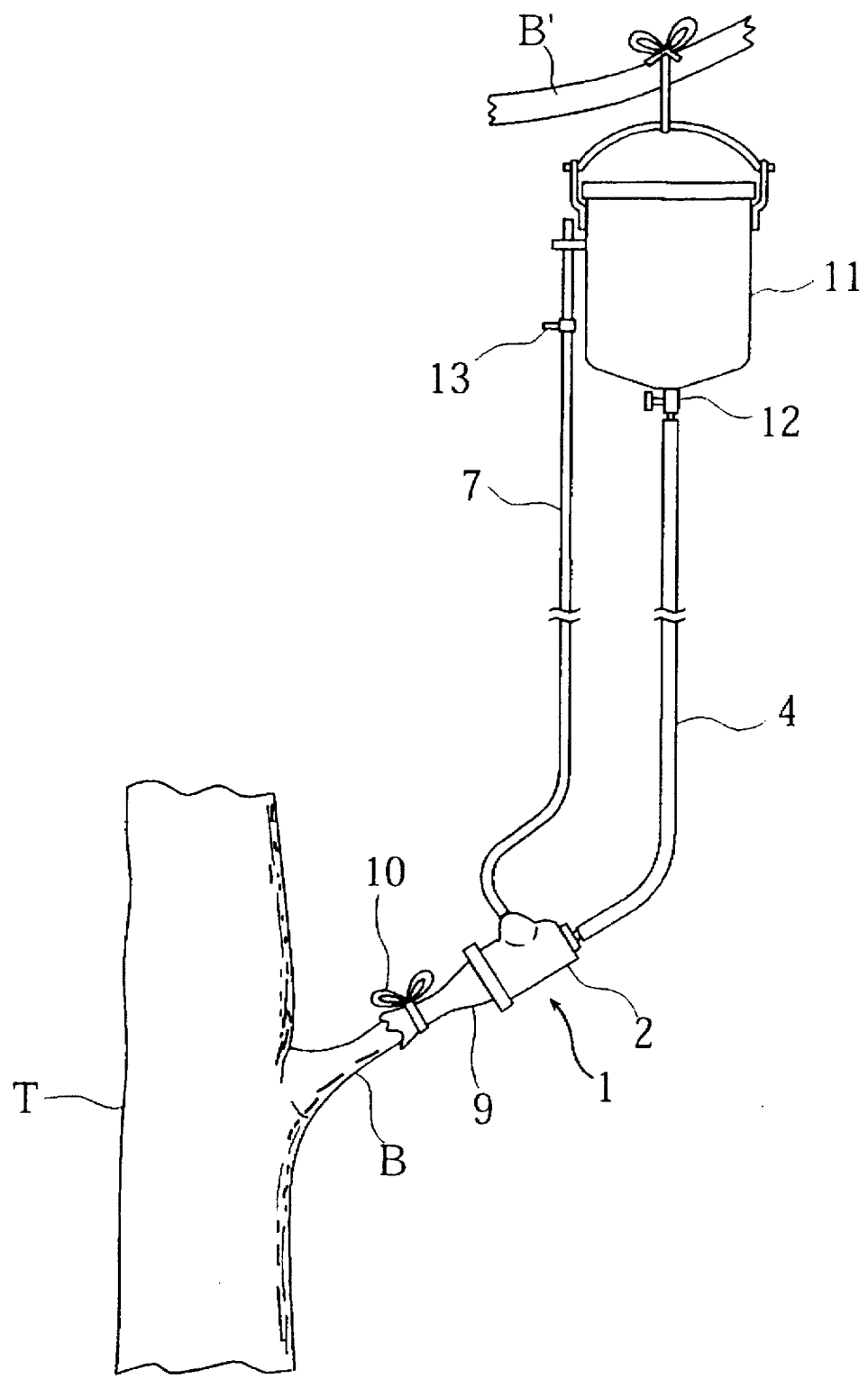
FIG. 3 is also a fragmentary view showing the same tree to which the liquid feeding apparatus shown in FIG. 1 is attached.

As shown in FIGS. 1 and 3, the liquid feeding apparatus 1 is mounted to the selected branch B in a manner such that the cut offshoots B1, B2 are inserted through the fixing hood 9 into the container body 2. At this time, the air vent connector 6 is directed upward, and the respective cut faces of the bifurcated offshoots B1, B2 are located immediately under the air vent connector 6.

In the above-described condition, the both ends of the tightening strap 10 is firmly tied together around the fixing hood 9 (see FIG. 3). As a result, the fixing hood 9 is diametrically contracted around the selected branch B for fixation thereto.

The liquid supply connector 3 is connected to one end of the liquid supply tube 4 while the other end of the liquid supply tube 4 is connected to a bottom valve 12 of a liquid storage tank 11 which is suspended from a different branch B' of the same target tree T above the liquid feeding apparatus 1. The tank 11 may contain a suitable amount of a liquid material such as an insecticide liquid.

On the other hand, the air vent connector 6 is connected to one end of the air vent tube 7 while the other end of the air vent tube 7 is held open to the atmosphere and may be laterally attached to the tank 11 at a higher position than the liquid surface level within the tank 11. An upper portion of the air vent tube 7 may be preferably provided with a pinch cock 13 (or a roller clamp). Further, the air vent tube 7 may be preferably made of a transparent material for enabling visual inspection of the liquid level within the air vent tube 7.

In operation, the valve 12 is opened to supply the liquid material into the liquid feeding apparatus 1 through the liquid supply tube 4. As the liquid material fills the container body 2 and the fixing hood 9, air originally present inside the liquid feeding apparatus 1 is expelled out of the container body 2 through the air vent connector 6 and the air vent tube 7, and the liquid material ultimately flows into the air vent tube 7. At this time, since the air vent connector 6 is provided at the upwardly bulging portion 5 of the container body 2 in continuity with the rounded corner portion 5a, the rounded configuration near the air vent connector 6 facilitates complete expelling of air from the container body 2. If the liquid material overflows from the upper end of the air vent tube 7, the pinch cock 13 (or roller clamp) is operated to close the tube 7.

As a result of the above-described operation, the liquid material supplied to the liquid feeding apparatus 1 is effectively absorbed via the bifurcated offshoots B1, B2 (providing a high liquid absorbing ability) of the selected branch B for distribution over the entire tree T. Experiments have revealed that it takes about 1-3 three months before the liquid material is distributed over the entire tree T. The liquid filling condition within the liquid feeding apparatus 1 may be visually monitored due to the transparent nature of the container body 2.

While the liquid storage tank 11 need be initially located above the liquid feeding apparatus 1 (see FIG. 3) for filling the latter with the liquid material, the tank 11 may be later lowered below the liquid feeding apparatus 1 after the selected branch B starts absorbing the liquid material. This is because the branch B with the bifurcated offshoots B1, B2 has a high vitality and therefore provides a sufficient absorbing force for pumping up the liquid material from the lowered tank. However, it should be understood that the tank 11, if kept located higher than the liquid feeding apparatus 1, provides a gravitational liquid feeding ability which assists liquid absorption of the branch B.

As previously described, the fixing hood 9 is elastically flexible for diametrical contraction which is caused by the tightening of the plastic strap 10 or the like. Thus, the liquid feeding apparatus 1 may be adaptable to a branch having no bifurcation. Referring again to FIG. 2, for example, the selected branch B of the target tree T may be cut at a position C3 for removing the bifurcated offshoots B1, B2, and the liquid feeding apparatus 1 may be attached to the thus cut branch B.

Further, the fixing hood 9 of the liquid feeding apparatus 1 may be attached to a branching root portion which branches out from a main root (basic root indispensible for growth) of a target tree but which has bifurcated offshoots. In this case, the bifurcated offshoots of the branching root portion are cut near the point of bifurcation for attachment to the fixing hood 9 of the liquid feeding apparatus 1, and the tank 11 may be placed on the ground or suspended from a suitable tree branch.

Similarly to the case of utilizing a branch for liquid feeding, the number of branching root portions (having bifurcated offshoots) to be selected for liquid feeding depends also on the eye-level trunk diameter of the target tree. If the eye-level trunk diameter of the target tree T is less than 10 cm, only one branching root portion may be selected for liquid feeding. If the eye-level trunk diameter of the target tree T is in the range of 10-30 cm, three branching root portions may be preferably selected. If the eye-level trunk diameter of the target tree T is above 30 cm, at least four branching root portions may be preferably selected.

Figure 4:
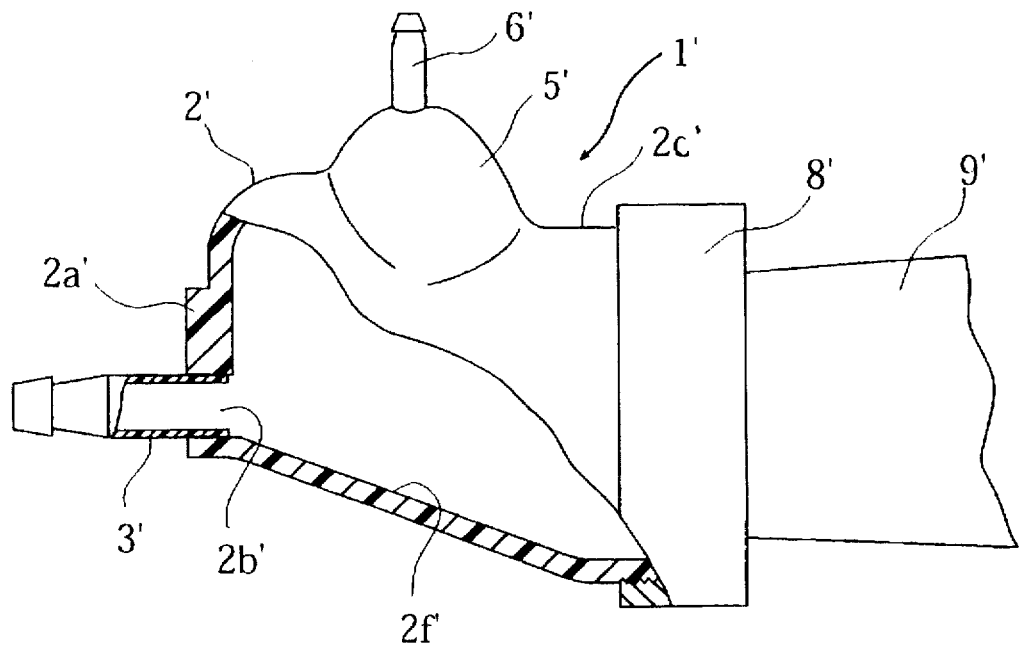
FIG. 4 is a side view, partially in section, showing another liquid feeding apparatus embodying the present invention.
Figure 5:
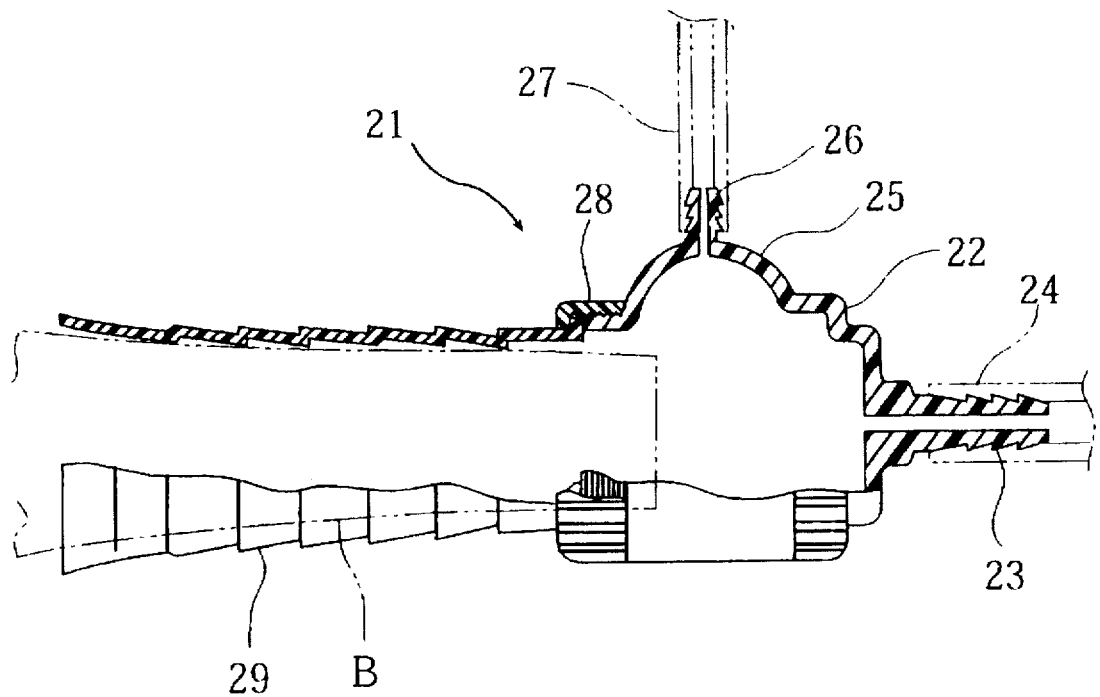
FIG. 5 is a side view, partially in section, showing a prior art liquid feeding apparatus.

FIG. 4 shows a liquid feeding apparatus according to a second embodiment of the present invention. The liquid feeding apparatus of this embodiment designated by reference numeral 1' is similar in basic structure to that of the first embodiment. Thus the same reference numerals as used for the first embodiments are also used with a prime (') for indicating the corresponding parts.

However, the second embodiment differs from the first embodiment in that the container body 2' has a bottom wall 2f which is inclined downwardly rearward from the liquid supply port 2b'. Such inclination of the bottom wall 2f is advantageous for feeding the liquid material to the target tree with a minimum liquid remainder in the container body 2'.

The preferred embodiments of the present invention being thus described, it is obvious that the same may be varied in many ways. For instance, a liquid material may be forcibly supplied to the liquid feeding apparatus from the liquid storage tank by means of an intervening pump. Such variations are not to be regarded as a departure from the spirit and scope of the invention, and all such variations as would be obvious to those skilled in the art are intended to be included within the scope of the following claims.

I claim:

1. A method for feeding a liquid material to a tree by using a liquid feeding apparatus which has a container body, the tree having a branching portion with bifurcated offshoots, the method comprising the steps of:

cutting the bifurcated offshoots in a manner such that they partially remain with the branching portion;

attaching the liquid feeding apparatus to the branching portion in a manner such that the remaining bifurcated offshoots are inserted into the container body; and supplying the liquid material into the container body from a liquid storage tank while expelling air from the container body.

2. The method according to claim 1, wherein the liquid material is selected from the group consisting of an insecticide liquid, a nutritious liquid and water.

3. The method according to claim 1, wherein the branching portion of the tree is a branch which extends out from the trunk.

4. The method according to claim 1, wherein the branching portion of the tree is a root.

5. The method according to claim 1, wherein the liquid storage tank is located above the liquid feeding apparatus.

6. An apparatus for feeding a liquid material to a tree, comprising:

a container body;

an elastically flexible fixing hood connected to the container body for receiving a branching portion of the tree;

liquid supply means for supplying the liquid material into the container body;

vent means for expelling air from the container body; and tightening means for elastically contracting the fixing hood to fix the container body to the branching portion.

7. The apparatus according to claim 6, wherein the container body is transparent.

8. The apparatus according to claim 6, wherein the tightening means is a tightening strap attached to the fixing hood.

9. The apparatus according to claim 6, wherein the container body has an upwardly bulging portion to which the vent means is connected.

10. The apparatus according to claim 9, wherein the bulging portion of the container body is continuous with a rounded corner portion.

11. The apparatus according to claim 6, wherein the container body has a bottom wall which is downwardly inclined from the liquid supply means.

* * * * *